(12) United States Patent
Braudaway et al.

(10) Patent No.: US 6,628,802 B1
(45) Date of Patent: Sep. 30, 2003

(54) MARKING AND DETERMINING DISTORTION IN AN IMAGE

(75) Inventors: Gordon Wesley Braudaway, Yorktown Heights, NY (US); Louis Paul Herzberg, Monsey, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/493,356

(22) Filed: Jan. 28, 2000

Related U.S. Application Data (60) Provisional application No. 60/117,921, filed on Jan. 29, 1999.

(51) Int. Cl.$^7$ .............................. G06K 9/36; G09C 3/00; H04K 1/02
(52) U.S. Cl. ...................... 382/100; 382/232; 358/3.28; 380/54; 380/252; 380/287
(58) Field of Search ................................. 382/100, 232; 380/210, 287, 252, 54; 713/176; 358/3.28

(56) References Cited

U.S. PATENT DOCUMENTS

| | | | | |
|---|---|---|---|---|
| 4,998,010 A | * | 3/1991 | Chandler et al. | 235/494 |
| 5,825,892 A | * | 10/1998 | Braudaway et al. | 380/51 |
| 6,064,764 A | * | 5/2000 | Bhaskaran et al. | 382/183 |
| 6,198,832 B1 | * | 3/2001 | Maes et al. | 382/100 |
| 6,201,881 B1 | * | 3/2001 | Masuda et al. | 382/100 |
| 6,233,684 B1 | * | 5/2001 | Stefik et al. | 713/176 |
| 6,281,903 B1 | * | 8/2001 | Martin et al. | 345/421 |
| 6,332,031 B1 | * | 12/2001 | Rhoads et al. | 382/100 |
| 6,369,904 B1 | * | 4/2002 | Bhattacharjya et al. | 358/1.14 |
| 6,438,251 B1 | * | 8/2002 | Yamaguchi | 382/100 |
| 6,449,367 B2 | * | 9/2002 | Van Wie et al. | 380/232 |

OTHER PUBLICATIONS

Braudaway et al, Protecting publicly–avilable images with a visible image watermark, Proceedings of SPIE, the International Society of Optical Engineering, Feb. 1996, vol 2659, p 126–133.*

* cited by examiner

Primary Examiner—Bhavesh M. Mehta
Assistant Examiner—Christopher Sukhaphadhana
(74) Attorney, Agent, or Firm—Louis P. Herzberg (57) ABSTRACT

The present invention provides methods and apparatus that reverse the notion of the attack process in using intentional image distortion techniques as a means of indelibly marking an original image. It also provides for imparting and removing intentional image distortion to further obscure an embedded invisible watermark. It further provides means for hiding a watermark embedded into a watermarked image. It also provides for imparting distortion on an reference image to form a single level or multilevel caricature of the entire (or part of) the reference image.

29 Claims, 4 Drawing Sheets

MARKING AND DETERMINING DISTORTION IN AN IMAGE

This application claims priority from Provisional application assigned Ser. No. 60/117,921, filed on Jan. 29, 1999.

CROSS REFERENCES

The present application is related to the following applications: entitled, "Recovering An Invisible Digital Image From A Distorted Images Replica," by inventors Gordon Braudaway et al., assigned Ser. No. 09/240,212 and entitled, "Composing A Realigned Image", by inventors Gordon Braudaway et al., assigned Ser. No. 09/351,199, which are incorporated herein by reference in their entirety.

FIELD OF THE INVENTION

This application relates to the field of digitized imaging. It is more specifically directed to image marking and determining distortion in and removing it from an image.

BACKGROUND OF THE INVENTION

With the development of means of production and circulation of digital images, and the means of imbedding relatively invisible watermarks into digital images ostensibly to convey ownership of the image, there is now financial incentive to attempt to render an imbedded watermark undetectable. Pixel locations of a watermarked image are presumed to correspond to those in an unmarked original image. Generally, the watermark is imbedded by altering only the values of the pixel components of the original image, not their geometric positions. This may be accomplished employing such methods as described in U.S. Pat. No. 5,825,892 which is incorporated herein by reference in its entirety.

Some methods of attacking an imbedded watermark rely on constructing a new image, called a distorted image, that is based on the watermarked image. Pixels in the distorted image are placed at subtly distorted positions relative to those in the watermarked image. Pixel component values in the distorted image are determined by two-dimensional interpolation of component values of neighboring pixel in the watermarked image. To those skilled in the art it is obvious that excessive pixel position-distortion will cause the distorted image to become a caricature of the watermarked image, thus diminishing or destroying its economic value. Whether a distortion is excessive is a subjective measure. For a distorted image to be useful, it requires that whatever linear or nonlinear distortion methods that are used by an attacker have to be used sparingly, and in such a manner as to produce smoothly varying and relatively small position distortions. This is so as to be essentially unobjectionable and casually unnoticeable to untrained observers. The human visual system, as a qualitative measuring device, can be relied upon to readily detect excessive distortion.

It would be advantageous to have a method which distorts selective parts of an image but leaves other parts undistorted. The method would indeed form different types of caricature of the image. The method should be such that the distortion is reversible by the authority that inserted it. Furthermore, distortion upon distortion are selectively imported upon the image each level of distortion being reversible in its own right rather than just allowing removal of all distortion.

BRIEF SUMMARY OF THE INVENTION

The present invention provides, firstly, methods and apparatus that reverse the notion of the attack process and use intentional image distortion as a means of indelibly marking an original image; it is, therefore, an alternative means of conveying image ownership. Secondly, intentional image distortion is used to further obscure an imbedded invisible watermark, such as one applied according to methods as described in U.S. Pat. No. 5,825,892 which is incorporated herein in entirety by reference.

In one aspect the method of the present invention utilizes an undistorted reference image relative to which measurements of distortion are made. For this purpose, either the unmarked original image or an undistorted but invisibly watermarked copy of the original image, called a watermarked image, can serve equally well as the reference image.

A semiautomatic method for composing a realigned image is described in Docket number Y0999-022, entitled, "Recovering Invisible Digital Image Watermarks From Distorted Images," by inventors Gordon Braudaway et al.; and an automatic method for composing a realigned image is described in Docket number Y0999-034, entitled, "Composing A Realigned Image." Both of these methods are designed to remove geometric distortion from a distorted image relative to a reference image. In the present invention, the methods for distortion removal is reversed. The reference image is distorted intentionally to form an intentionally-warped image as another means of imbedding an invisible and indelible mark in the intentionally-warped image. In the terminology of the referenced Dockets, distorted pixel coordinates [u,v] will be computed from reference pixel coordinates [x,y] and the coefficients a, b, c, d, e, and f from the interpolation equations.

From this point on reference is made interchangeably to the automatic or semiautomatic methods. To distort the reference image intentionally, six values from the interpolation equations, a, b, c, d, e, and f, are specified. For example, the values specified for a and e are randomly and independently selected from the domain $0.95 < a, e < 1.05$, the values for b and d are randomly and independently selected from the domain $-0.05 < b, d < 0.05$. and the values for c and f are randomly and independently selected from the domain $-10.0 < c, f < 10.0$.

The inverse of the square submatrix, $S_A$, is factored into four primitive image manipulation matrices. The reference image is manipulated by the four primitive image manipulations to form the intentionally-warped image. The intentional distortion of a reference image to form the intentionally-warped image is a method of indelibly marking an image. In this usage, the indelible mark is imbedded using the four primitive image manipulating matrices operating on the reference image. The small amounts of distortion that are injected into the image using the coefficients a, b, c, d, e, and f of submatrix $S_A$ and $S_B$ are known only to the marking authority and can be recreated at will from a secure random sequence. As used herein, the term "secure random sequence" refers to the product of a cryptographicly secure pseudo random number generating method that reproduces an identical sequence of uniformly distributed pseudo random numbers each time it is initialized with the same two parameters: 1., a secret key value and 2., a non-secret seed value. The indelible mark, so imbedded, is detected by measuring the distortion of the intentionally-warped image relative to the reference image using the method described in Docket number Y0999-034, or equivalently, by the method described in Docket number Y0999-022, and then verifying that measured values a', b', c', d', e', and f' are within a threshold value of values a, b, c, d, e, and f that were used when the intentionally-warped image was formed.

Figure 1:
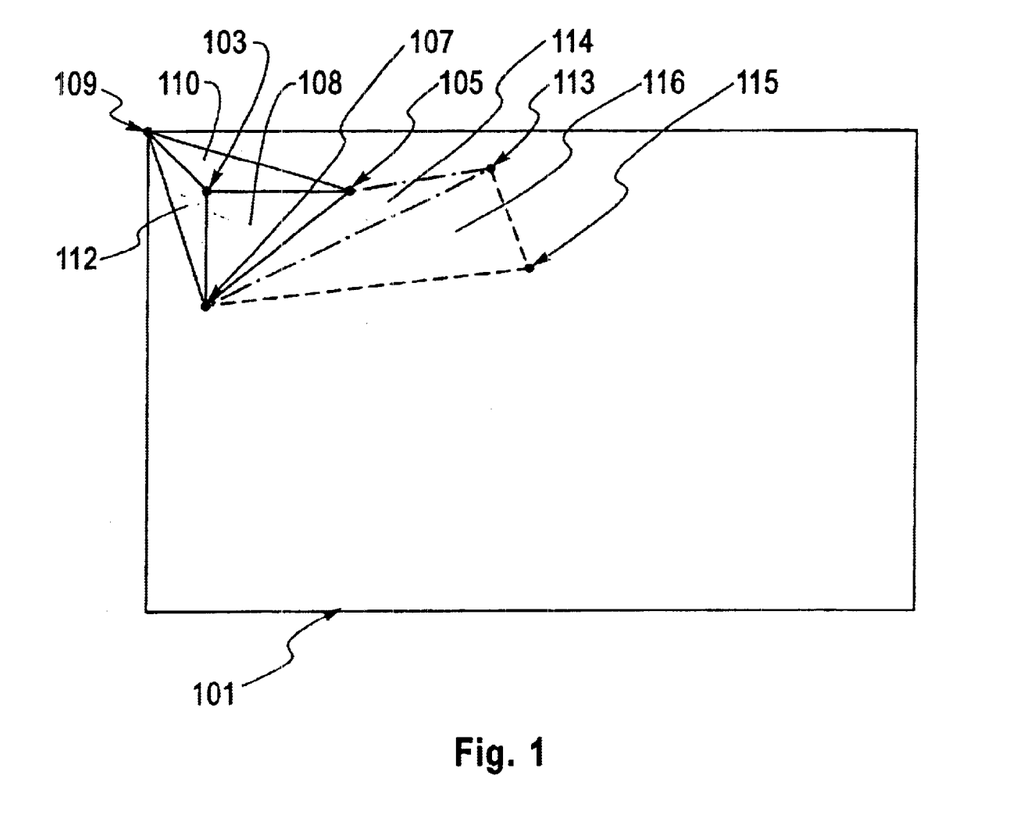
FIG. 1 is a schematic diagram showing a progression of non-overlapping triangular areas on an image in accordance with the present invention.

Alternatively to intentionally distorting a reference image with a single distortion defined by a, b, c, d, e, and f, a different distortion can be injected into most of many small triangular areas of the original image. Beginning with a single triangular area placed arbitrarily within the boundaries of the reference image, the number of triangular areas within an image plane can be expanded by adding one vertex at a time to form additional non-overlapping triangular areas to a total of N distinct triangular areas. FIG. 1 shows such a progression for defining non-overlapping triangular areas of an image. Referring to FIG. 1, a first triangular area (108) is arbitrarily defined in the image plane (101) by specifying the pixel coordinates of three vertices (103), (105), and (107). A fourth vertex (109) is added and two additional non-overlapping triangular areas (110) and (112) are defined. A fifth vertex (113) is added and triangular area (114) is defined. Then a sixth vertex (115) is defined and triangular area (116) is defined. The number of vertices can be increased until the entire image is covered with non-overlapping triangles. All corners of the image are used as a vertex.

Again referring to FIG. 1, when moving from the first triangular area (108), where all six coefficients $a_1, b_1, c_1, d_1, e_1$, and $f_1$ were selected sequentially from an initialized secure random sequence, to the second triangular area (110), one vertex is added. Thus only two of the six coefficients can be altered so that resulting triangular areas in the intentionally-warped image match seamlessly at the shared common boundary defined by vertices (103) and (105). Therefore, two coefficients are selected at random from the six, and each of the two selected coefficients is given a random value sequentially chosen from the secure random sequence. The remaining four unchosen coefficients are solved for, using the three pairs of coordinates of the vertices from the reference image, the two pairs of coordinates of the vertices defining the common boundary from the intentionally-warped image and the two chosen coordinate values. However, when moving to the third triangular area (112), no additional vertex is added, so the six coefficients must be computed from the three pairs of coordinates of the vertices from the reference image and the three pairs of coordinates of the corresponding vertices from the intentionally-warped image.

Different small variations of distortion can be applied, two at a time, whenever an vertex is added, but only one of the resulting triangular areas (if more than one are generated) can have the newly chosen random distortions. This is a fundamental mathematical requirement if the resulting triangles in the intentionally-warped image are to abut one another seamlessly.

The indelible mark can be detected by verifying that the values of $a'_j, b'_j, c'_j, d'_j, e'_j$, and $f'_j$, for j=1, ..., N, are the same, within a threshold value, as those used to distort each of the small triangular areas of the intentionally-warped image. Both the injected random values, $a_j, b_j, c_j, d_j, e_j$, and $f_j$, and the pixel positions of the vertices must be known to (or be capable of being recreated by) the marking authority.

Figure 2:
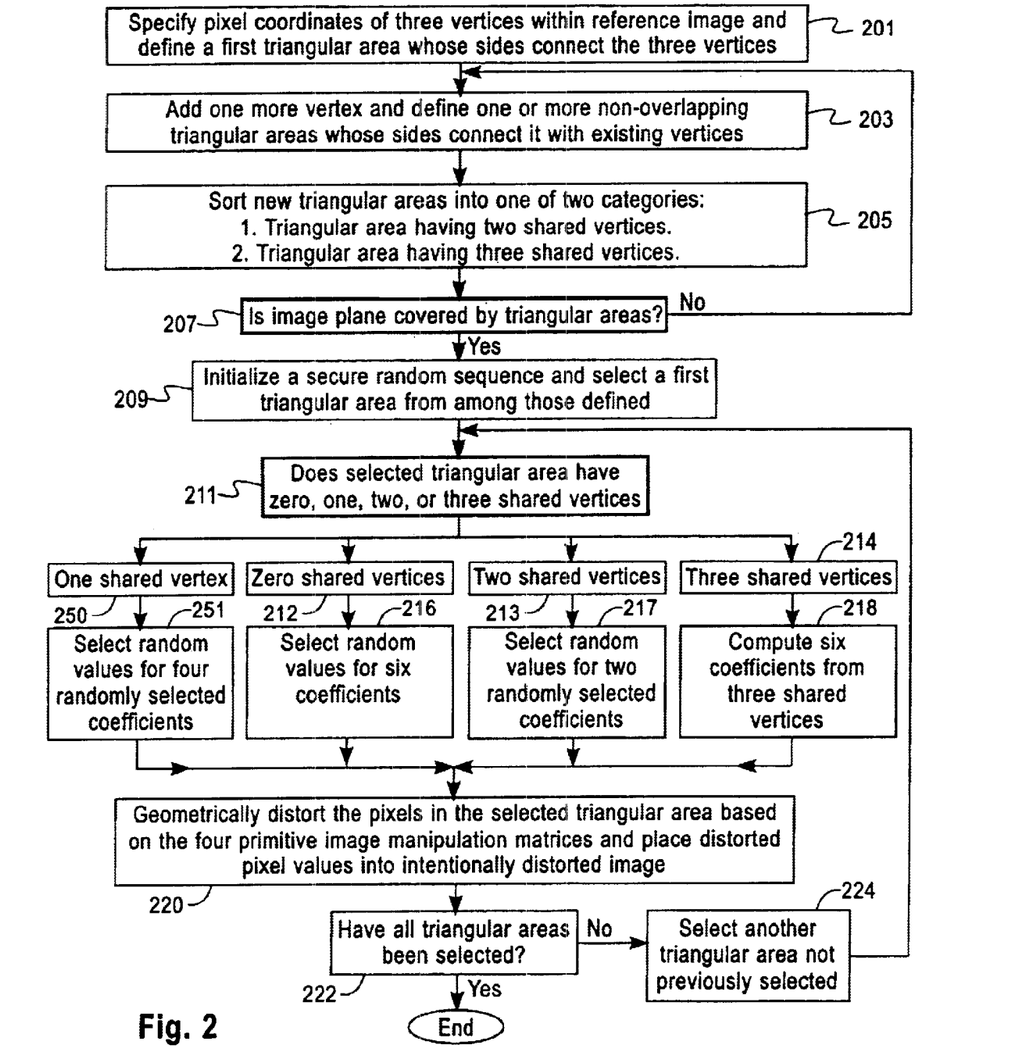
FIG. 2 is a logical flow diagram in accordance with the present invention.

The method of the present invention is expressed in logical flow in FIG. 2. Referring to FIG. 2, the first triangular area is defined by arbitrarily specifying the pixel coordinates of three vertices that lie within the plane of the reference image. The sides of the first triangular area are the lines connecting the three vertices (201). One additional vertex is added in the vicinity of the previously specified vertices, and one or more triangular area are defined by connecting the added vertex with the vertices previously specified. The triangular area or areas so added must be distinct in that they do not overlap existing triangular areas (203). The newly added triangular area (or areas) are sorted into two lists; one list having those triangular areas that share two vertices with previously defined triangular areas, and a second list having those areas that share three vertices (205). If the entire plane of the reference image is not covered by triangular areas (207), steps (203) through (207) are repeated; otherwise the first triangular area is selected and a single secure random sequence generator is initialized for use in the following steps (209).

DETAILED DESCRIPTION

The selected triangular area is tested to determine whether it has zero, one, two or three shared vertices (211) and the flow branches accordingly (212), (213) and (214). If the triangular area has zero shared vertices, (only the said first triangular area can have zero shared vertices), all six coefficient values, $a_j, b_j, c_j, d_j, e_j$, and $f_j$, are selected sequentially from the secure random sequence and linearly mapped to lie within their appropriate domains (216). If the selected triangular area has only one shared vertex (250), four of the six coefficients are randomly selected (251), based on the next sequential values of the secure random sequence, and their values are selected sequentially from additional sequential values from the secure random sequence and linearly mapped to lie within their appropriate domains. The remaining two unselected coefficients are solved for, using the three pairs of coordinates of the vertices from the reference image, the pairs of coordinates of the shared vertex from the intentionally warped image, and the values of the four selected coefficients. If the selected triangular area has only two shared vertices, two of the six coefficients are randomly selected, based on the next sequential values of the secure.random sequence, and their values are selected sequentially-from additional sequential values from the secure random sequence and linearly mapped to lie within their appropriate domains. The remaining four unselected coefficients are solved for, using the three pairs of coordinates of the vertices from the reference image, the two pairs of coordinates of vertices on the common boundary from the intentionally warped image, and the values of the two selected coefficients (217). The solution is thus constrained so the distorted/warped pixel coordinates lying on the common side of the abutting triangular areas match seamlessly. If the selected triangular area has three shared vertices, all six coefficients must be computed from the coordinates of the three pairs of vertices from the reference image and the coordinates of respective vertices from the intentionally warped image, thus causing the triangular area to abut seamlessly with its neighbors (218). The four separated paths join before proceeding to the next step.

The six resulting coefficients determined in the previous step are applied using the interpolation equations and their factored primitive image manipulation matrices, as explained previously, to produce distorted/warped pixel values from the selected triangular area of the reference image for placement into the intentionally-warped image (220). If all of the triangular areas have been selected (222), the intentionally-warped image is complete, and contains an indelible mark injected into it according to the present invention. Otherwise, another previously unselected triangular area is selected (224) and steps (211) through (222) are repeated for that selected triangular area.

An other use of intentional distortion of an image is to further hide an imparted invisible watermark. In this usage, the reference image is an image invisibly watermarked by methods such as described in U.S. Pat. No. 5,825,892. Then the watermarked image is warped using the coefficients and vertex pixel positions whose values are known only to the marking authority. To detect the watermark, the intentionally-warped image must first be realigned with the original image to remove the intentional distortion before watermark detection is attempted.

Figure 3:
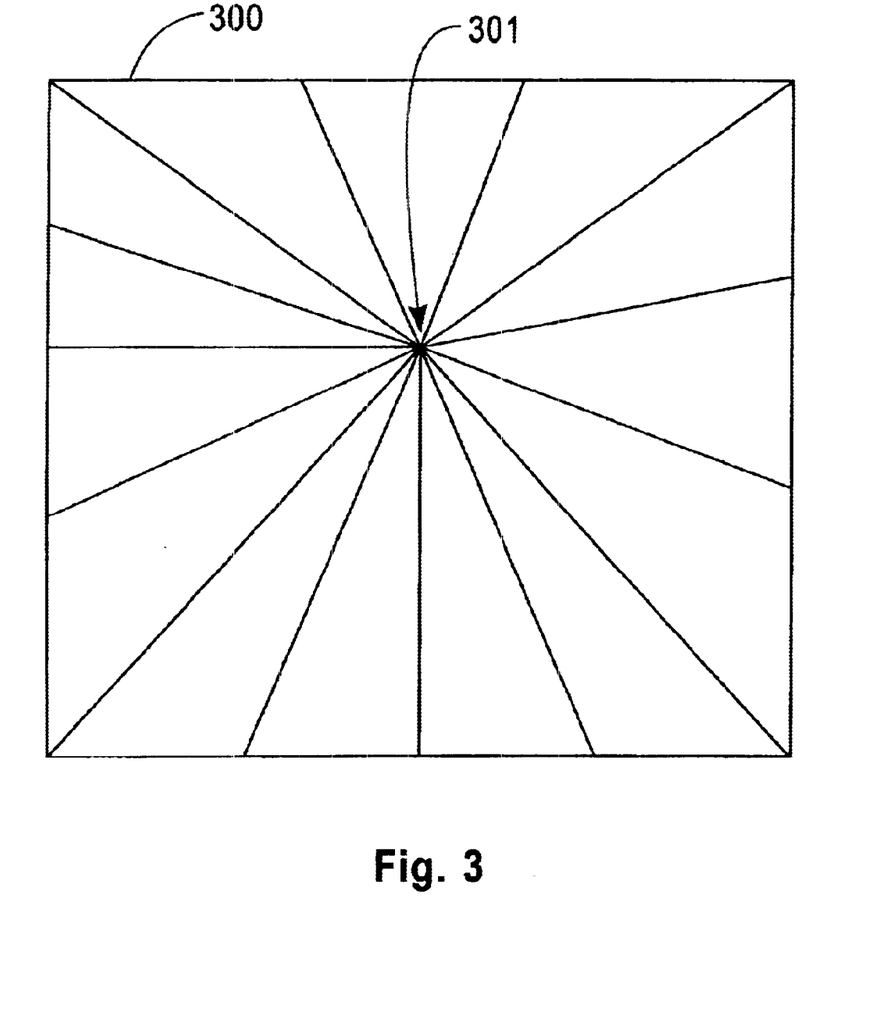
FIG. 3 is an alternative arrangement of non-overlapping triangular areas on an image in accordance with the present invention.

Still another use of the intentional distortion method is to provide a means of obtaining a controllable caricature. FIG. 3 shows a simple example using a single vertex at a selected vertex (301) within a reference image 300 and performing the steps described above for each of the triangles within the reference image 300.

Figure 4:
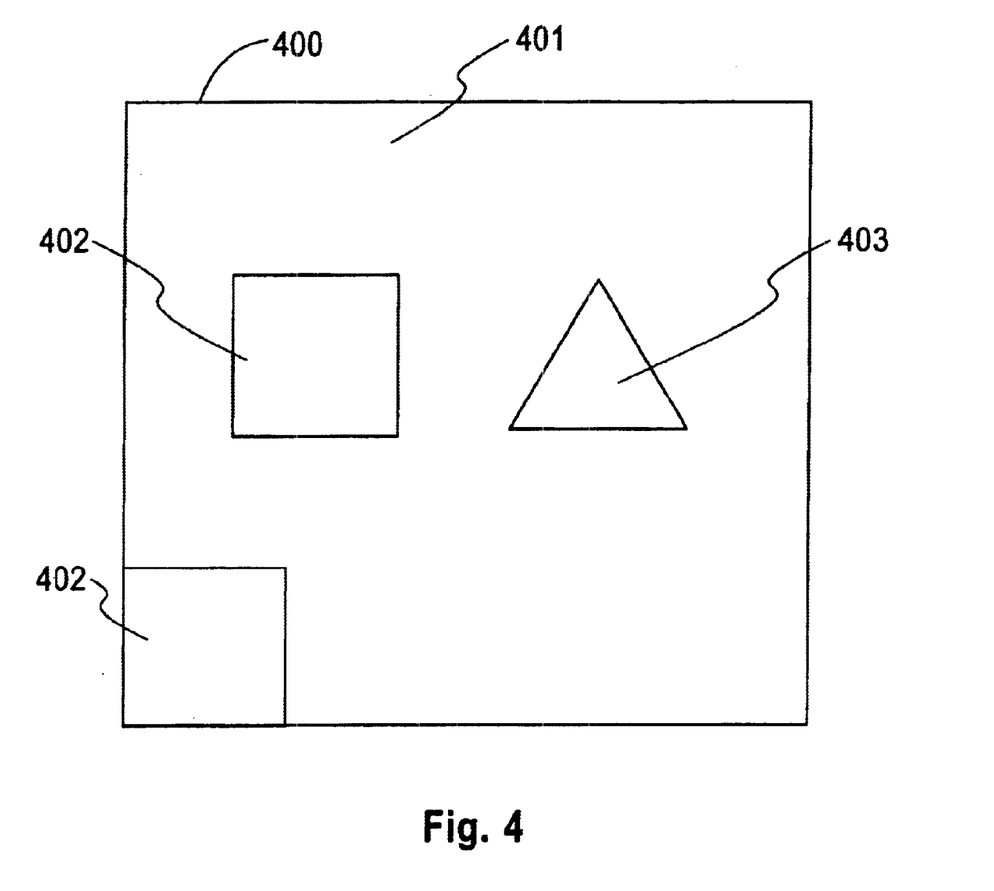
FIG. 4 is a schematic diagram of selectively characterizing parts of an image in accordance with the present invention.

FIG. 4 shows an example of a method of selectively performing a caricaturization of parts of a reference image 400. Areas 402, 403 and 404 are subdivided into triangular areas that are relatively small, say between 0.01% to 0.05% of the image. These areas will provide reversible distortion which are relatively not discernible to a viewer. The remaining reference area 401 is subdivided in large triangular areas and will generally produce discernible distortion. If selected properly the different parts of the image give different levels of desired caricaturization of the referenced image. Those skilled in the art will realize that the use of the present invention may be extended to other uses within the concepts included in the claims.

The presenting invention also provides an article of manufacture comprising a computer usable medium having computer readable program code means embodied therein for causing the embedding of an indelible mark into a reference image, the computer readable program code means in the article of manufacture comprising computer readable program code means for causing a computer to effect any method of the present invention.

The presenting invention also provides a computer program product comprising a computer usable medium having computer readable program code means embodied therein for causing a formation of a reversible caricature of a reference image, the computer readable program code means in the computer program product comprising computer readable program code means for causing a computer to effect any method of the present invention.

The presenting invention also provides a program storage device readable by machine, tangibly embodying a program of instructions executable by the machine to perform method steps for hiding a watermark embedded into a watermarked image, the method steps comprising the steps of the method of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

It is noted that the foregoing has outlined some of the more pertinent objects and embodiments of the present invention. This invention may be used for many image or image-like applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what we claim as new and desire to secure by Letters Patent is as follows:

1. A method for embedding an indelible mark into a reference image, the method comprising:

obtaining a digitized copy of said reference image; and embedding an amount of intentional warpage into the reference image, in a selected area bounded by the vertices of at least one triangle area, to form the mark by:

using four primitive image manipulating matrices factored from submatrix $S_A$ of interpolation equations, and using values of the initial coefficients a, b, c, d, e and f of submatrix $S_A$ operating on the reference image, said values being known only to a marking authority.

2. A method as recited in claim 1, further comprising:

detecting the indelible mark by measuring a degree of warping relative to the reference image by employing an image realignment method.

3. A method as recited in claim 2, further comprising:

verifying that values of measured coefficients a', b', c', d', e', and f' are within a threshold value of values of the initial coefficients a, b, c, d, e, and f embedded into the reference image as the indelible mark.

4. A method as recited in claim 1, further comprising:

detecting the vertices by employing an image realignment method forming a minimum necessary three points for warpage detection.

5. A method as recited in claim 1, further comprising expanding the number of triangle areas by:

adding one additional vertex at a time, forming at least one additional non-overlapping triangle area onto the reference image up to a total of N distinct triangle areas covering the entire reference image; and indelibly marking each of said triangular areas with a combination of randomly chosen and derived values of coefficients a, b, c, d, e, and f.

6. A method as in claim 5, wherein the step of indelibly marking includes:

testing each of said triangular areas to determine a number of shared vertices with a previously chosen triangles for which coefficients were selected; and randomly choosing only four coefficients if there is only one shared vertex, randomly choosing only two coefficients if there is two shared vertex.

7. A method as in claim 5, wherein each of said at least one additional non-overlapping triangle areas forms a small triangular area.

8. A method as in claim 7, wherein said small triangular area has less than 0.1% of the image area.

9. A method as recited in claim 1, further comprising:

detecting the indelible mark by verifying that the values of $a_j$, $b_j$, $c_j$, $d_j$, $e_j$, and $f_j$, for j=1, . . . , N, are within a threshold value, as those injected into each of the small triangular areas of the reference image as an indelible mark.

10. A method as recited in claim 1, wherein the reference image is a watermarked image formed into an intentionally warped image.

11. A method in accordance with claim 10 for imparting a watermark onto a digitized image comprising the steps of:

providing said digitized image comprised of a plurality of pixels, wherein each of said pixels includes brightness data that represents a brightness of at least one color; and multiplying said brightness data associated with at least one of said pixels by a predetermined brightness multiplying factor;

wherein said brightness multiplying factor has a relationship with a number taken from a random number sequence, said relationship is a linear remapping to provide a desired modulation strength.

12. A method as recited in claim 10, further comprising realigning the intentionally warped image with the reference image.

13. A method as recited in claim 1, wherein the mark is such as to form a caricature of the reference image.

14. A method as recited in claim 1, further comprising repeating the step of embedding a fixed number of times to form increasing amounts of intentional warpage.

15. A method as recited in claim 14, further comprising detecting and removing the indelible mark imparted in at least one of the steps repeated in the step of repeating.

16. A method for forming a reversible caricature of a reference image:

obtaining a digitized copy of said reference image; and embedding an amount of intentional warpage into the reference image to form the watermark, by:

using four primitive image manipulating matrices factored from submatrix $S_A$ of interpolation equations, and using values of the initial coefficients a, b, c, d, e, and f of submatrix $S_A$ operating on the reference image, said values being known only to a marking authority;

embedding the indelible mark into only a selected area within the reference image, said selected area being bounded by three vertices of a triangle;

detecting the three vertices by employing an image realignment method forming the minimum necessary three points for warpage detection;

expanding the number of triangles by:

adding one additional vertex at a time, forming at least one additional non-overlapping triangle area onto the reference image up to a total of N distinct triangle areas covering the entire reference image; and indelibly marking each of said triangular areas with randomly chosen or derived values of coefficients a, b, c, d, e and f.

17. A method as recited in claim 16, wherein a plurality of said each of said at least one additional non-overlapping triangle area includes at least five percent of the total reference image.

18. A method for hiding a watermark embedded into a watermarked image, the method comprising:

modifying the watermark by embedding into the watermarked image an intentional warpage by:

using four primitive image manipulating matrices factored from submatrix $S_A$ of interpolation equations operating on the watermarked image and forming an intentionally warped image by applying amounts of warpage into the watermarked image using values of the initial coefficients a, b, c, d, e, and f of submatrix $S_A$, said values being known only to an embedding authority; and realigning the warped image with the watermarked image to remove the deliberate warpage before detection of the watermark is attempted.

19. A method as recited in claim 18, further comprising:

detecting the warpage of the watermarked image by measuring a degree of warping relative to the unwarped watermarked image by employing an image realignment method.

20. A method for embedding and detecting an indelible mark into a reference image having a plurality of pixels, the method comprising:

inserting the indelible mark using coefficients of a pixel interpolation equation manipulating values of the pixels, forming an intentionally warped image; and embedding amounts of distortion into the reference image, said amounts of distortion being known only to an embedding authority, such that known information is embedded in and retrievable from the intentionally warped image; and realigning the warped image with the watermarked image to remove the deliberate warpage before detection of the watermark is attempted.

21. A method for indelibly marking an image, the method comprising:

defining a first triangular area by arbitrarily specifying pixel coordinates of three vertices that lie within a plane of a reference image, wherein the sides of the first triangular area are the lines connecting the three vertices;

adding one additional vertex in a vicinity of the previously specified three vertices, such as to define at least one more triangular area by connecting said one additional vertex with the vertices previously specified, wherein the triangular area or areas so added are distinct in that they do not overlap existing triangular areas;

sorting the newly added triangular area into two lists, one list having triangular areas that share two vertices with previously defined triangular areas, and a second list having triangular areas that share three vertices;

repeating the steps of adding and sorting until the plane of the reference image is entirely covered by triangular areas;

selecting said first triangular area, and initializing a single secure random sequence generator;

employing the single secure random sequence generator for:

testing each selected triangular area to determine whether said each selected triangular area has zero, two or three shared vertices;

if the triangular area has zero shared vertices, sequentially selecting all six coefficient values, $a_j$, $b_j$, $c_j$, $d_j$, $e_j$, and $f_j$, from the secure random sequence and linearly mapping said all six coefficient values to lie within respective appropriate domains;

if the selected triangular area has only two shared vertices, randomly selecting two of the six coefficients, based on the next sequential values of the secure random sequence, and sequentially selecting values for said two of the six coefficients from additional sequential values from the secure random sequence, and linearly mapping said values to lie within respective appropriate domains, solving for the remaining four unselected coefficients using the three pairs of coordinates of the vertices from the reference image, the two pairs of coordinates of vertices on the common boundary from the intentionally-distorted image, and the values of the two selected coefficients; and if the selected triangular area has three shared vertices, computing all six coefficients from the coordinates of the three pairs of vertices from the reference image and the coordinates of respective vertices from the intentionally-distorted image; and applying the six resulting coefficients determined in the previous step using the interpolation equations and their factored primitive image manipulation matrices in producing distorted pixel values from the selected triangular area of the reference image for placement into the intentionally-distorted image;

if all of the triangular areas have been selected, the intentionally-distorted image is complete with the indelible mark injected thereupon; otherwise selecting another previously unselected triangular area and repeating the steps from selecting through applying for each said unselected triangular area.

22. An article of manufacture comprising a computer usable medium having computer readable program code means embodied therein for causing embedding of an indelible mark into a reference image, the computer readable program code means in said article of manufacture comprising computer readable program code means for causing a computer to effect:

obtaining a digitized copy of a reference image; and embedding an amount of intentional warpage into adjacent non-overlapping areas of the reference image to form the watermark, by:

using four primitive image manipulating matrices factored from submatrix $S_A$ of interpolation equations, and using values of the initial coefficients a, b, c, d, e, and f of submatrix $S_A$ operating on the reference image first of the areas and reducing the number of selected random values in dependence in a second of the areas on the number of vertices by the first and second areas, said values being known only to a marking authority.

23. An article of manufacture as in claim 22 comprising: randomly choosing only four coefficients if there is only one shared vertex, randomly choosing only two coefficients if there is two shared vertex.

24. An article of manufacture as in claim 23, wherein said non-overlapping areas are triangles.

25. An article of manufacture comprising computer usable media for performing the steps of:

obtaining a digitized copy of a reference image; and embedding an amount of intentional warpage into non-overlapping triangular areas of the reference image to form the watermark, by:

using four primitive image manipulating matrices factored from submatrix $S_A$ of interpolation equations, and using values of the initial coefficients a, b, c, d, e, and f of submatrix $S_A$ operating on the non-overlapping triangles of the reference image, said values being known only to a marking authority.

26. An article of manufacture comprising a computer usable medium having computer readable program code means embodied therein for causing the hiding of a watermark embedded into a watermarked image the computer readable program code means in said article of manufacture comprising computer readable program code means for causing a computer to effect:

modifying a watermark on an image by embedding at least one non-overlapping triangular area into the watermarked image an intentional warpage by:

using four primitive image manipulating matrices factored from submatrix $S_A$ of interpolation equations, operating on the watermarked image and forming an intentionally warped image by applying amounts of warpage into the watermarked image using values of the initial coefficients a, b, c, d, e, and f of submatrix $S_A$, said values being known only to an embedding authority.

27. An article of manufacture comprising computer usable media for performing the steps of:

inserting an indelible mark onto one triangular area of an image using coefficients of a pixel interpolation equation manipulating values of the pixels, forming an intentionally warped image; and embedding amounts of distortion into the triangular area of the image, said amounts of distortion being known only to an embedding authority, such that known information is embedded in and retrievable from the intentionally warped image.

28. The article of manufacture of claim 27 including the steps of:

adding an additional triangular area;

if the additional triangular area has zero shared vertices, sequentially selecting all six coefficient values, $a_j$, $b_j$, $c_j$, $d_j$, $e_j$, and $f_j$, from the secure random sequence and linearly mapping said all six coefficient values to lie within respective appropriate domains;

if the additional triangular area has only two shared vertices, randomly selecting two of the six coefficients, based on the next sequential values of the secure random sequence, and sequentially selecting values for said two of the six coefficients from additional sequential values from the secure random sequence, and linearly mapping said values to lie within respective appropriate domains; solving for the remaining four unselected coefficients using the three pairs of coordinates of the vertices from the reference image, the two pairs of coordinates of vertices on the common boundary from the intentionally distorted image, and the values of the two selected coefficients.

29. An article of manufacture comprising computer usable media for performing the steps of:

defining a first triangular area by arbitrarily specifying pixel coordinates of three vertices that lie within a plane of a reference image, wherein the sides of the first triangular area are the lines connecting the three vertices;

adding one additional vertex in a vicinity of the previously specified three vertices, such as to define at least one more triangular area by connecting said one additional vertex with the vertices previously specified, wherein the triangular area or areas so added are distinct in that they do not overlap existing triangular areas;

sorting the newly added triangular area into two lists, one list having triangular areas that share two vertices with previously defined triangular areas, and a second list having triangular areas that share three vertices;

repeating the steps of adding and sorting until the plane of the reference image is entirely covered by triangular areas;

selecting the said first triangular area, and initializing a single secure random sequence generator;

employing the single secure random sequence generator for:

testing each selected triangular area to determine whether said each selected triangular area has zero, two or three shared vertices;

if the triangular area has zero shared vertices, sequentially selecting all six coefficient values, $a_j$, $b_j$, $c_j$, $d_j$, $e_j$, and $f_j$, from the secure random sequence and linearly mapping said all six coefficient values to lie within respective appropriate domains;

if the selected triangular area has only two shared vertices, randomly selecting two of the six coefficients, based on the next sequential values of the secure random sequence, and sequentially selecting values for said two of the six coefficients from additional sequential values from the secure random sequence, and linearly mapping said values to lie within respective appropriate domains; solving for the remaining four unselected coefficients using the three pairs of coordinates of the vertices from the reference image, the two pairs of coordinates of vertices on the common boundary from the intentionally-distorted image, and the values of the two selected coefficients; and if the selected triangular area has three shared vertices, computing all six coefficients from the coordinates of the three pairs of vertices from the reference image and the coordinates of respective vertices from the intentionally-distorted image; and applying the six resulting coefficients determined in the previous step using the interpolation equations and their factored primitive image manipulation matrices in producing distorted pixel values from the selected triangular area of the reference image for placement into the intentionally-distorted image;

if all of the triangular areas have been selected, the intentionally-distorted image is complete with the indelible mark injected thereupon; otherwise selecting another previously unselected triangular area and repeating the steps from selecting through applying for each said unselected triangular area.

\* \* \* \* \*